United States Patent
Mundt et al.

(10) Patent No.: US 10,055,127 B2
(45) Date of Patent: Aug. 21, 2018

(54) SYSTEM AND METHOD FOR MONITORING PARAMETERS AT A DATA STORAGE DEVICE

(71) Applicant: Dell Products, LP, Round Rock, TX (US)

(72) Inventors: Kevin W. Mundt, Austin, TX (US); Sandor Farkas, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 65 days.

(21) Appl. No.: 14/879,728

(22) Filed: Oct. 9, 2015

(65) Prior Publication Data
US 2017/0102878 A1   Apr. 13, 2017

(51) Int. Cl.
G11C 29/00 (2006.01)
G06F 3/06 (2006.01)
G06F 11/10 (2006.01)

(52) U.S. Cl.
CPC .......... G06F 3/0604 (2013.01); G06F 3/0619 (2013.01); G06F 3/0653 (2013.01); G06F 3/0673 (2013.01); G06F 11/1004 (2013.01)

(58) Field of Classification Search
CPC .... G06F 3/0604; G06F 3/0619; G06F 3/0653; G06F 3/0673; G06F 11/1004; G06F 11/006; G06F 11/2236; G06F 11/2268; G06F 11/2635; G06F 11/2294; G11B 7/1267; G11B 7/00454; G11B 7/00455; G11B 7/00456; G11B 7/0062; G11B 7/00736; G11B 7/24038
See application file for complete search history.

(56) References Cited

U.S. PATENT DOCUMENTS

| | | | |
|---|---|---|---|
| 6,316,988 B1 * | 11/2001 | Forehand | G11B 19/00 323/283 |
| 6,385,739 B1 * | 5/2002 | Barton | G06F 11/006 713/189 |
| 6,404,713 B1 * | 6/2002 | Ueki | G11B 7/1267 369/47.5 |
| 6,892,311 B2 | 5/2005 | Coppock et al. | |
| 8,484,539 B1 * | 7/2013 | Yeung | G06F 1/3203 714/755 |
| 9,432,298 B1 * | 8/2016 | Smith | H04L 49/9057 |
| 2003/0086345 A1 * | 5/2003 | Ueki | G11B 7/00456 369/47.51 |
| 2003/0212923 A1 | 11/2003 | Coppock et al. | |
| 2006/0282709 A1 * | 12/2006 | Shu | G06F 11/0727 714/100 |
| 2010/0110815 A1 * | 5/2010 | Lee | G11C 5/143 365/211 |
| 2011/0238887 A1 * | 9/2011 | Bazzani | G06F 3/0614 711/103 |
| 2013/0311683 A1 | 11/2013 | Mundt et al. | |
| 2015/0072606 A1 | 3/2015 | Mundt et al. | |
| 2016/0062435 A1 * | 3/2016 | Arakawa | G06F 11/1008 714/764 |

* cited by examiner

Primary Examiner — Guerrier Merant
(74) Attorney, Agent, or Firm — Larson Newman, LLP

(57) ABSTRACT

An operational parameter is accessed at a data storage device. The operational parameter is encoded using a serial data protocol. The encoded operational parameter is superimposed on an activity indicator signal outputted by the data storage device. The activity indicator signal is configured to be coupled to a light emitting diode.

19 Claims, 7 Drawing Sheets

SYSTEM AND METHOD FOR MONITORING PARAMETERS AT A DATA STORAGE DEVICE

FIELD OF THE DISCLOSURE

This disclosure generally relates to information handling systems, and more particularly relates to monitoring parameters at a data storage device in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-10 illustrate techniques for monitoring operational parameters associated with a data storage device, such as a hard disk drive (HDD) or a solid state drive (SSD). For example, a storage enclosure processor (SEP) or a baseboard management controller (BMC) can monitor operating temperatures at storage devices included at a server or data storage system. Other operational parameters that can be monitored include power utilization, vibration information, status and error codes, and the like. The parameters can be monitored without interrupting normal operation of the storage devices. For example, drive temperature can be monitored concurrently with read or write accesses at the drive. In particular, firmware within the data storage device can periodically access the operational parameters, encode the information into a binary bit stream message, and superimposes the message on an activity indicator signal that controls a light emitting diode (LED) activity indicator that is located external to the data storage device. For example, the serial ATA (SATA) standard connector includes a pin (pin #11) that can be used to illuminate an LED when the drive is accessed. A decoding circuit, coupled to an SEP, a BMC, or another type of controller, can extract the bit stream message from the activity signal. For example, an SEP or BMC can regulate cooling fans based on temperature information extracted from the activity signal. Because the drive parameters are accessible out-of-band, concurrent with data accesses, the parameters can be monitored more frequently than is practical using traditional techniques. For clarity, the disclosed techniques are described below with reference to drive temperature. One of skill will appreciate that these techniques are applicable to other drive parameters.

Figure 1:
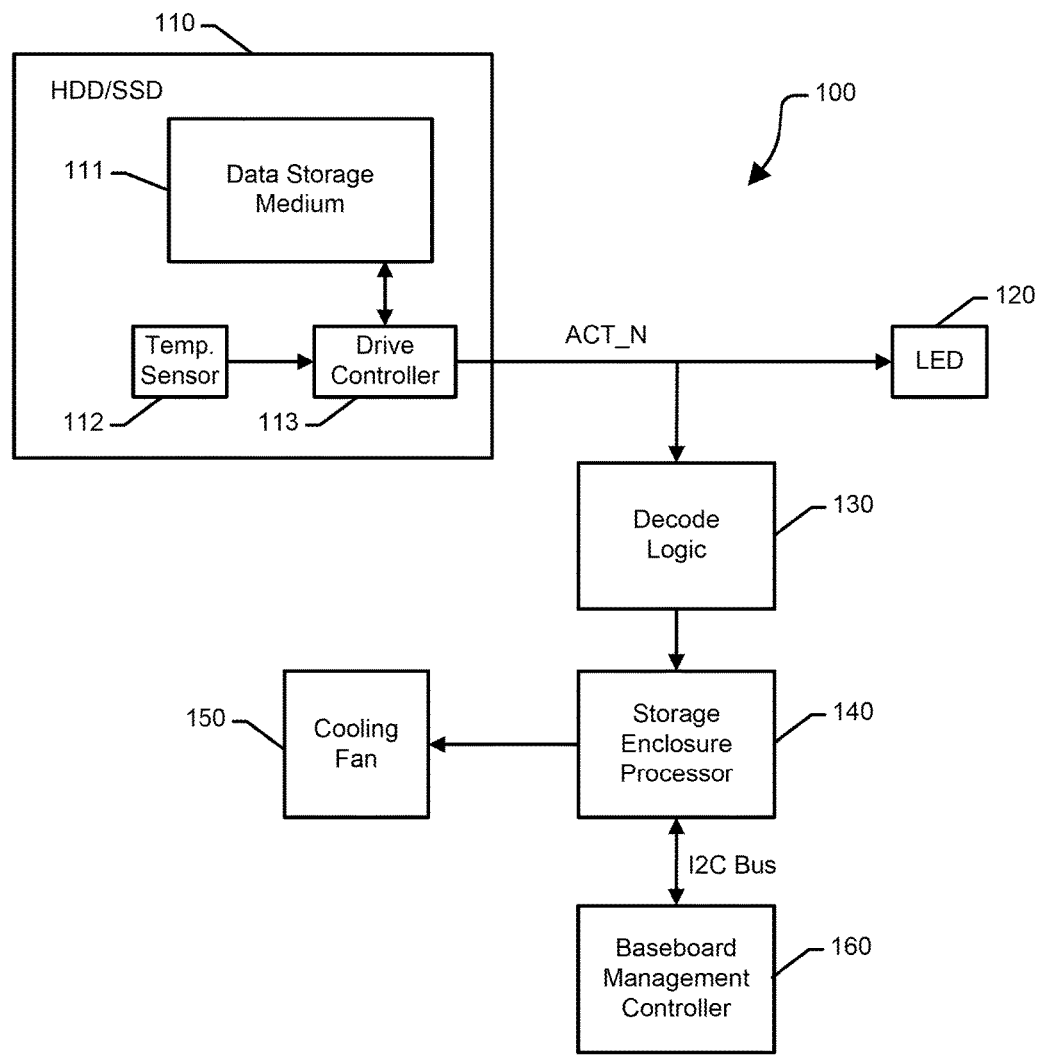
FIG. 1 is a block diagram of a system for monitoring parameters at a data storage device in an information handling system according to an embodiment of the present disclosure.

FIG. 1 shows a system 100 for monitoring parameters at a data storage device in an information handling system according to an embodiment of the present disclosure. System 100 includes a data storage device 110, an LED 120, decode logic 130, an SEP 140, a cooling fan 150, and a baseboard management controller 160. Data storage device 110 can include a HDD device, an SSD device, a HDD/SDD hybrid device, or another data storage device having an activity indicator interface signal. Data storage device 110 includes data storage medium 111, a temperature sensor 112, and a drive controller 113. Data storage medium 111 can include rotational magnetic disks, non-volatile semiconductor memory, or another type of storage or memory devices. Temperature sensor 112 is configured to provide internal operating temperature information in response to an inquiry from drive controller 113. Drive controller 113 is configured to store and retrieve data at data storage medium 111 in response to requests received at a device interface of data storage device 110, as well as many other control functions necessary to administer storage, error correction, power management, low level and high level formatting of medium 111, and the like. For simplicity, data access interface signals and busses are not shown, however the data access interface can be compliant with serial ATA (SATA), serial attached SCSI (SAS), peripheral component interconnect express (PCIe) or another interface protocol.

The SATA and SAS standard interface protocols typically includes an interface signal configured to be coupled to an LED, such as LED 120, labeled ACT_N at FIG. 1. For example, pin 11 of the SATA power connector is configured to provide a staggered spin up/activity indicator signal to illuminate an activity indicator LED. For example, signal ACT_N can illuminate LED 120 at a frequency of 0.5 Hertz during spin up/spin down of rotational medium, illuminate at a frequency of 10 Hertz to indicate write access activity, and the like. The ACT_N interface is historically referred to as an open-collector interface, meaning that a pull-up resistor external to the device 110 is used to transition signal ACT_N to a logic high state, while transistor circuit internal to device 110 can be activated to transition signal ACT_N to a logic low state. Techniques disclosed herein are not limited to an open-collector interface.

Drive controller 113 is configured to encode one or more operational parameters associated with device 110 and superimpose the encoded information on activity signal ACT_N. For example, drive controller 113 can receive temperature information from temperature sensor 112, encode the information using a serial data protocol to generate a binary bit stream, and mix the bit stream with the activity information provided to signal ACT_N. For example, a pull down transistor inside device 110 can be activated to transition signal ACT_N to a logic low state corresponding to the binary bit stream. The binary bit stream can include the encoded temperature information, and can include additional information such as a cyclic redundancy check (CRC) code to provide error detection and/or correction of the encoded device parameter. This superimposition process is described in detail below with reference to FIGS. 2-10.

Decode logic 130 is configured to extract and decode the encoded temperature information that has been superimposed onto signal ACT_N. The temperature information can be provided to SEP 140, and further propagated via an I2C bus interface or another bus or signal interface to BMC 160, if desired. For example, SEP 140 can use the extracted temperature information to regulate operation of cooling fan 150. SEP 140 can increase the speed of fan 150, or engage additional fans, if the operating temperature of device 110 exceeds a predetermined threshold. Alternatively, BMC 160 may be responsible for regulating cooling fan 150. SEP 140, fan 150, and BMC 160 are shown to illustrate how an operational parameter, such as drive temperature, can be utilized, but are not necessarily required. For example, decode logic 130 can provide decoded or partially decoded information to a microcontroller via a general-purpose input/output (GPIO) interface. Alternatively, decode logic 130 can be implemented using a microcontroller, which can be configured to extract and decode the information encoded on signal ACT_N.

Figure 2:
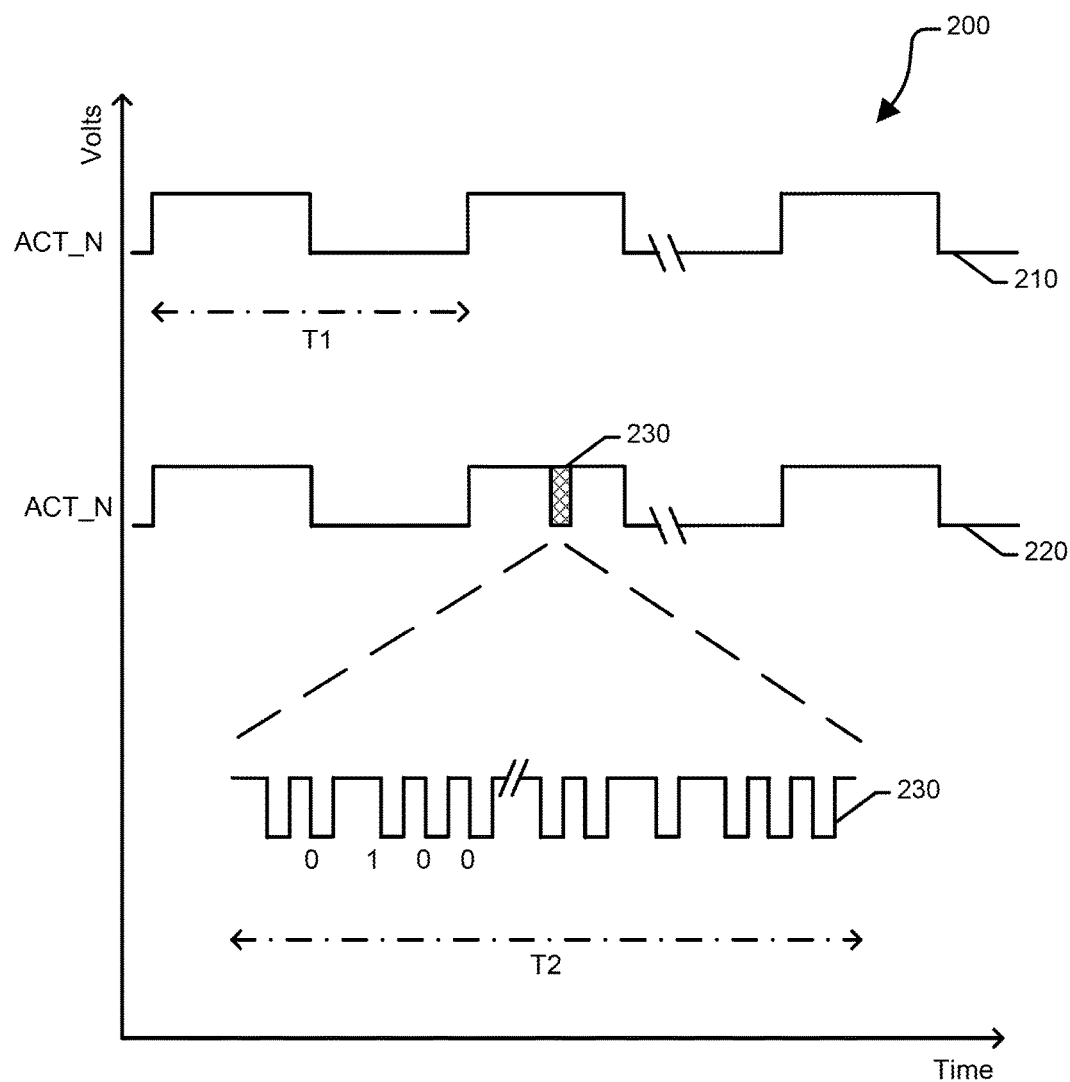
FIG. 2 is a timing diagram illustrating the activity indicator signal of FIG. 1 according to a specific embodiment of the present disclosure.

FIG. 2 is a timing diagram 200 illustrating activity indicator signal ACT_N of FIG. 1 according to a specific embodiment of the present disclosure. Timing diagram 200 includes waveform 210 showing oscillation of signal ACT_N when indicating normal accesses at drive 100. In an embodiment, signal ACT_N oscillates at a frequency of ten Hertz. Accordingly, one period of oscillation identified by reference T1 is one hundred milliseconds, including a logic high state for fifty milliseconds and a logic low state for fifty milliseconds. Timing diagram 200 also includes waveform 220, where an encoded message 230 has been superimposed onto signal ACT_N by drive controller 113 to output an internal drive parameter. Drive controller can provide the encoded message at signal ACT_N periodically, and can do so without receiving a request for the information from outside device 110. Timing diagram 200 also shows a magnified view of the encoded message bit stream. The bit stream has a duration identified by reference T2.

In one embodiment, the binary bit stream can include forty-eight bits, where a duration of each bit of the bit stream averages approximately seventy microseconds. Therefore, the resulting bit stream has a total duration of 48×70 us, or approximately 3.5 milliseconds. Accordingly, the bit stream has a frequency of approximately sixteen kHz. The encoded message can be superimposed on activity signal ACT_N. If signal ACT_N is indicating data access by flashing at a frequency of ten Hz (50 ms on, and 50 ms off), the encoded message when combined with the activity information requires approximately ten percent of each half phase of activity signal ACT_N. One of skill will appreciate that the encoded bit stream can include a greater or a fewer number of bits of information. The frequency of the bit stream can vary considerably; dependent on computational capabilities of drive controller 113, switching capabilities of the ACT_N interface, capabilities of decode logic 130, and the like.

In one embodiment, the bit stream can include a first set of bits identifies a hardware ID of device 110, a second set of bits corresponding to the operational parameter being communicated, and a third set of bits corresponding to a CRC code generated based on the entire message or a portion of the message. The information can be encoded using a binary encoding protocol, such as pulse-width or duty cycle encoding. The bit stream can include an initial set of bits that provide a unique binary preamble sequence used by decoder 130 to identify a start of a message.

Figure 3:
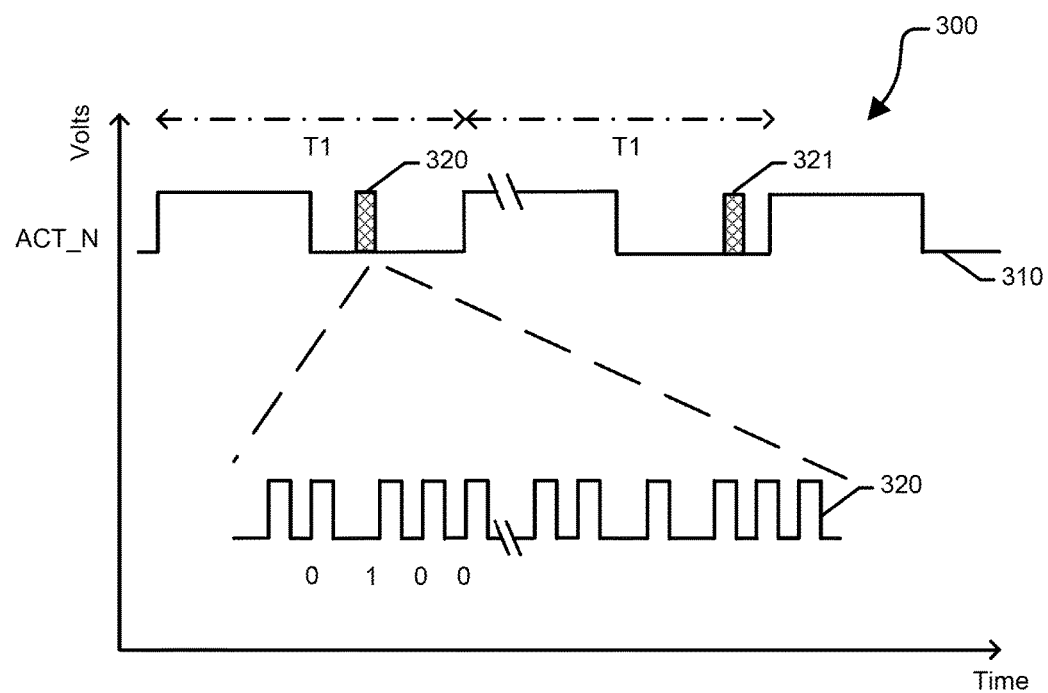
FIG. 3 is a timing diagram illustrating the activity indicator signal of FIG. 1 according to another embodiment of the present disclosure.

FIG. 3 is a timing diagram 300 illustrating activity indicator signal ACT_N of FIG. 1 according to another embodiment of the present disclosure. Timing diagram 300 is similar to timing diagram 200, and includes waveform 310 illustrating signal ACT_N with a superimposed message 320 and message 321. At FIG. 2, message 230 is shown inserted by drive controller 113 during a logic high phase of signal ACT_N, while at FIG. 3, messages 320 and 321 are inserted during logic low phases of signal ACT_N. An encoded message can in be inserted during either phase, or both phases, of signal ACT_N. Timing diagram 300 also illustrates how messages can be inserted at different locations with a phase of signal ACT_N. For example, message 320 is shown inserted approximately seventy milliseconds into period T1, while message 321 is shown inserted approximately ninety milliseconds into period T1. In one embodiment, the location that a message is inserted within a phase or within a period of signal ACT_N can be randomized.

Figure 4:
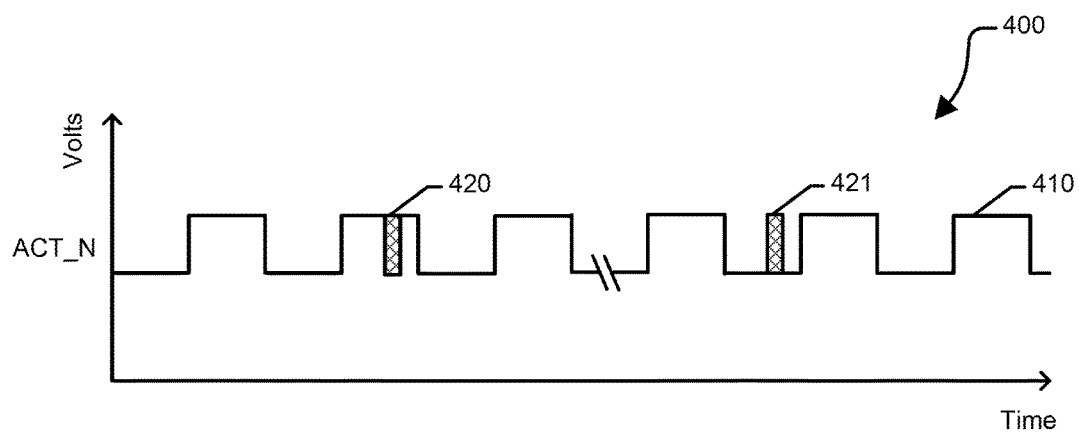
FIG. 4 is a timing diagram illustrating the activity indicator signal of FIG. 1 according to still another embodiment of the present disclosure.

FIG. 4 is a timing diagram 400 illustrating activity indicator signal ACT_N of FIG. 1 according to still another embodiment of the present disclosure. Timing diagram 400 includes waveform 410 including a first encoded operational parameter message 420 and a second message 421. Message 420 is inserted during a logic high phase of signal ACT_N, while message 421 is inserted during a logic low phase of signal ACT_N. Messages can be inserted in consecutive cycles or phases, however for reasons described below; it can be advantageous to superimpose messages less frequently, such as once every five or ten cycles of signal ACT_N. In one embodiment, drive controller 113 can determine when to insert a message based on a random number generator. For example, controller 113 can be configured to insert a message at least once every ten cycles of signal ACT_N. A random number generator can generate a random number once every ten cycle. The random number can range from one and ten and the number can be used to select within which cycle of the set of 10 forthcoming cycles to insert the message. For another example, a random number generator can used to determine how many cycles of signal ACT_N to skip between message insertions.

Figure 5:
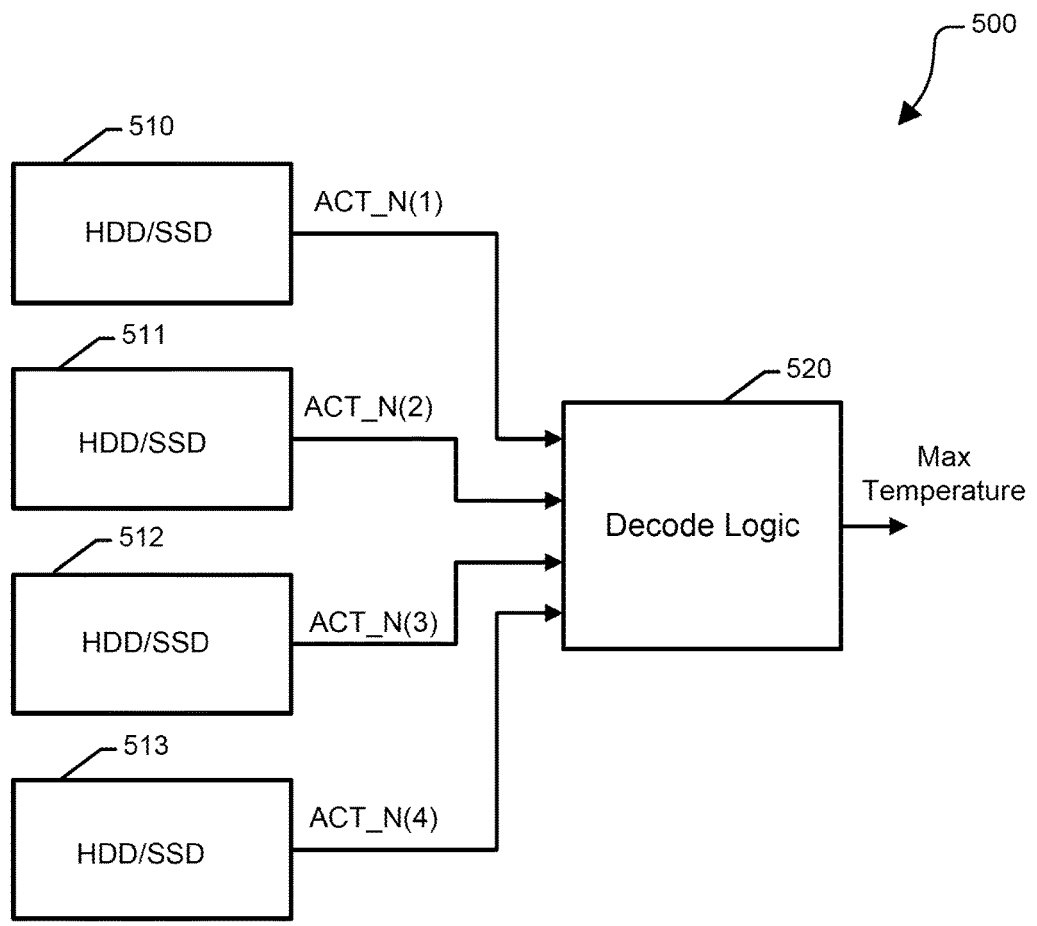
FIG. 5 is a block diagram illustrating a system for monitoring parameters at multiple data storage devices in an information handling system according to a specific embodiment of the present disclosure.

FIG. 5 shows a system 500 for monitoring parameters at multiple data storage devices in an information handling system according to an embodiment of the present disclosure. System 500 includes data storage devices 510, 511, 512, and 513, and decode logic 520. Each device includes an activity indicator signal, ACT_N(1), ACT_N(2), ACT_N(3), and ACT_N(4), respectively. The four activity indicator signals are coupled to a corresponding input at decode logic 520. As described above, a drive controller at each data storage device can inject messages on their respective ACT_N activity signal. Each message can include an operational parameter, such as a temperature at the device generating the message. Decode logic 520 is configured to extract and decode the messages from each ACT_N signal. For example, data storage devices 510-513 can be included in a thermal zone of a data storage enclosure where cooling of all devices in the zone is supplied by a single fan or group of fans. In one embodiment, decode logic 520 can be configured to monitor messages from each data storage device and identify a highest temperature reported by any one of the devices within the thermal zone. The cooling system can be regulated based on the highest temperature that is reported. ACT_N activity signals provided by each data storage device are not synchronized with respect to another device, and this should be taken into consideration by decode logic 520, as described below.

Figure 6:
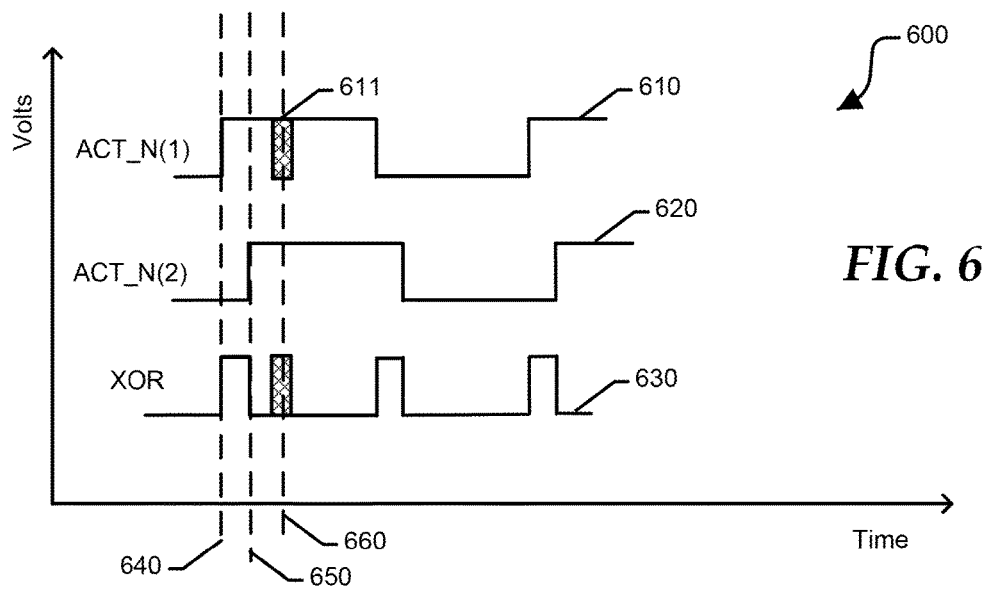
FIG. 6 is a block diagram illustrating a technique for implementing the decode logic of FIG. 5 according to a specific embodiment of the present disclosure.

FIG. 6 shows a technique 600 for implementing decode logic 520 of FIG. 5 according to a specific embodiment of the present disclosure. The purpose of this technique is to funnel multiple activity signals into one wire to be provided to a microcontroller, such as SEP 140 or BMC 160. Timing diagram 600 includes a waveform 610 representing activity signal ACT_N(1), a waveform 620 representing activity signal ACT_N(2), and a waveform 630 representing an exclusive-OR function of the signal ACT_N(1) and ACT_N (2). Waveform 610 includes an operational parameter message 611. Decode logic 520 includes XOR gates arranged to perform the function:

ACT_N(1) XOR ACT_N(2) XOR ACT_N(3) XOR ACT_N(4)   (1)

For clarity, timing diagram 600 only illustrates operation of a single XOR stage. Immediately prior to time reference 640, an XOR function of waveforms 610 and 620 is at a logic low state because the value of each of signals ACT_N (1) and ACT_N(2) is the same. At time reference 640, waveform 630 transitions to a logic high state when the value of each signal is different, and returns to a logic low state at time reference 650 when their values are once again the same. At time reference 660, message 611 is superimposed with ACT_N(1) signal 610. Because waveform 620 is at a logic high state and does not transition during the interval corresponding to message 611, an XOR function generates a binary encoded bit stream corresponding to message 611, however, the bit stream waveform is inverted. Therefore, an operational parameter and CRC value, if present, must be bit-wise inverted.

Figure 7:
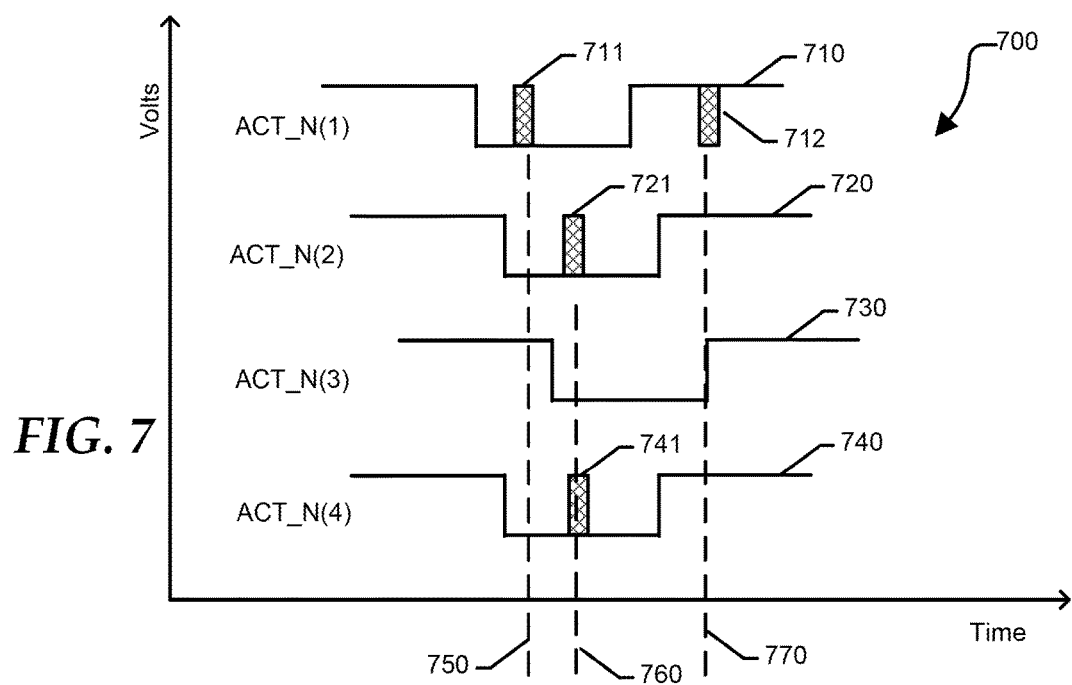
FIG. 7 is a timing diagram illustrating the activity indicator signals of FIG. 5 according to a specific embodiment of the present disclosure.

FIG. 7 is a timing diagram 700 illustrating the activity indicator signals of FIG. 5 according to a specific embodiment of the present disclosure. Timing diagram 700 includes waveform 710 corresponding to activity indicator signal ACT_N(1), waveform 720 corresponding to signal ACT_N (2), waveform 730 corresponding to signal ACT_N(3), and waveform 740 corresponding to signal ACT_N(4). Each of the waveforms are shown to be asynchronous with respect to each other, as are corresponding clock signals within each of data storage devices 510-513. Waveform 710 includes a first message 711 at time reference 750, and a second message 712 at time reference 770. Waveform 720 includes a message 721 at time reference 760, and waveform 740 includes a message that happens to coincide approximately with message 721 at time reference 760.

If decode logic 520 is implemented using XOR gates as described above, collisions can occur between the asynchronous signals such that correct decoding of a message may be impossible. For example, message 711 can be correctly extracted and decoded because none of the other activities signals transition during the interval corresponding to message 711. However, at time reference 760, an XOR function of waveforms 710-740 will effectively combine the bit stream waveforms of message 721 and 741. Validation of the combined message using the encapsulated (and corrupted) CRC value will fail, and the messages should be discarded. Corruption of a message can also occur when a message interval coincides with a periodic transition of another activity signal, as illustrated at time reference 770 where waveform 730 transitions during the interval of message 712. Randomizing the placement of message as described above can greatly reduce the incidence of collision, as can increasing the frequency of the message bit stream so that the duration of each message is reduced.

Figure 8:
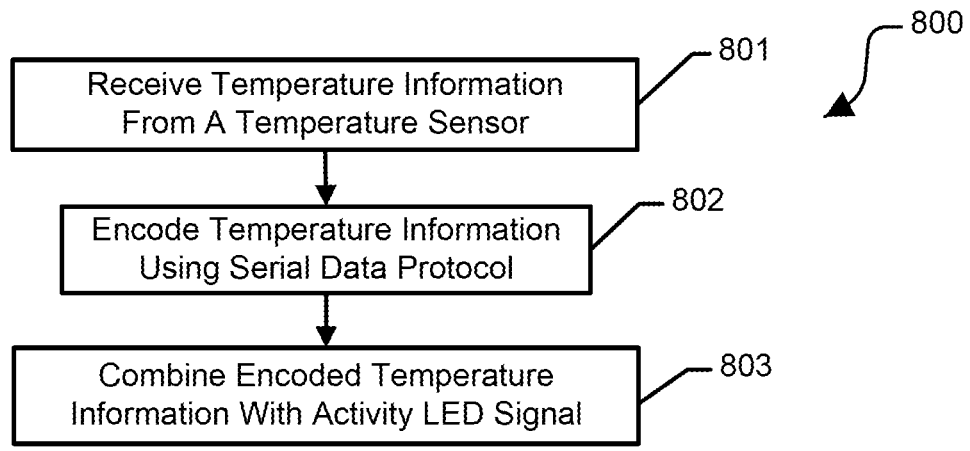
FIG. 8 is a flow diagram illustrating a method for encoding operational parameters at a data storage device according to a specific embodiment of the present disclosure.

FIG. 8 shows a method 800 for encoding operational parameters at a data storage device according to a specific embodiment of the present disclosure. Method 800 begins at block 801 where temperature information is received from a temperature sensor. For example, drive controller 113 can access temperature sensor 112 of FIG. 1. Method 800 continues at block 802 where the temperature information can be encoded using a serial data protocol. For example, drive controller 113 can generate a binary bit stream representing the temperature information. Additional information can be included in the encoded message such as a hardware identifier associated with the data storage device, error detection/correction codes, and the like. The method proceeds to block 803 where the encoded temperature information is combined with a drive activity LED signal. For example, drive controller 113 can superimpose the encoded parameter bit stream with signal ACT_N outputted by device 110. While method 800 is described in the context of drive temperature information, one of skill will appreciate that any drive parameter can be encoded and multiplexed with a drive activity signal as described herein.

Figure 9:
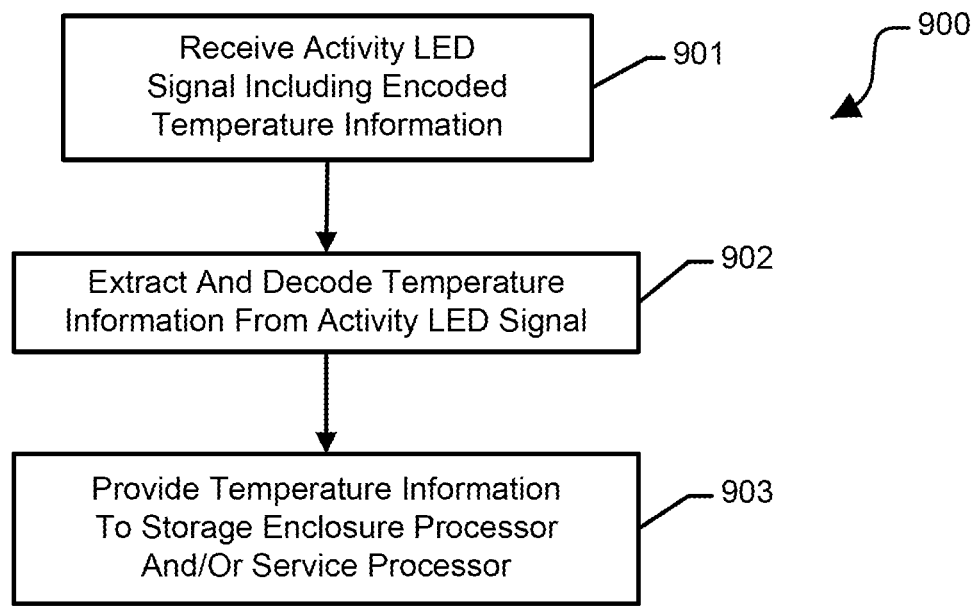
FIG. 9 is a flow diagram illustrating a method for monitoring operation parameters provided by data storage devices according to a specific embodiment of the present disclosure.

FIG. 9 shows a method 900 for monitoring operation parameters provided by data storage devices according to a specific embodiment of the present disclosure. Method 900 begins at block 901 where an activity LED signal including encoded temperature information is received. For example, decode logic 130 of FIG. 1 can monitor drive activity signal ACT_N. The method continues at block 902 where the temperature information is extracted from the activity LED signal and decoded. For example, decode logic 130 can identify a message preamble included in a bit stream present on signal ACT_N. Once the preamble has been detected, the following bits in the message bit stream can be collected and decoded to identify the original temperature information. Decode logic 130 can utilize an XOR function as described above with reference to FIGS. 5-7 to extract encoded messages from multiple activity signals. The method completes at block 903 where the temperature information can be provided to a storage enclosure processor and/or service processor. For example, SEP 140 can regulate the speed of cooling fan 150 based on the decoded temperature.

Figure 10:
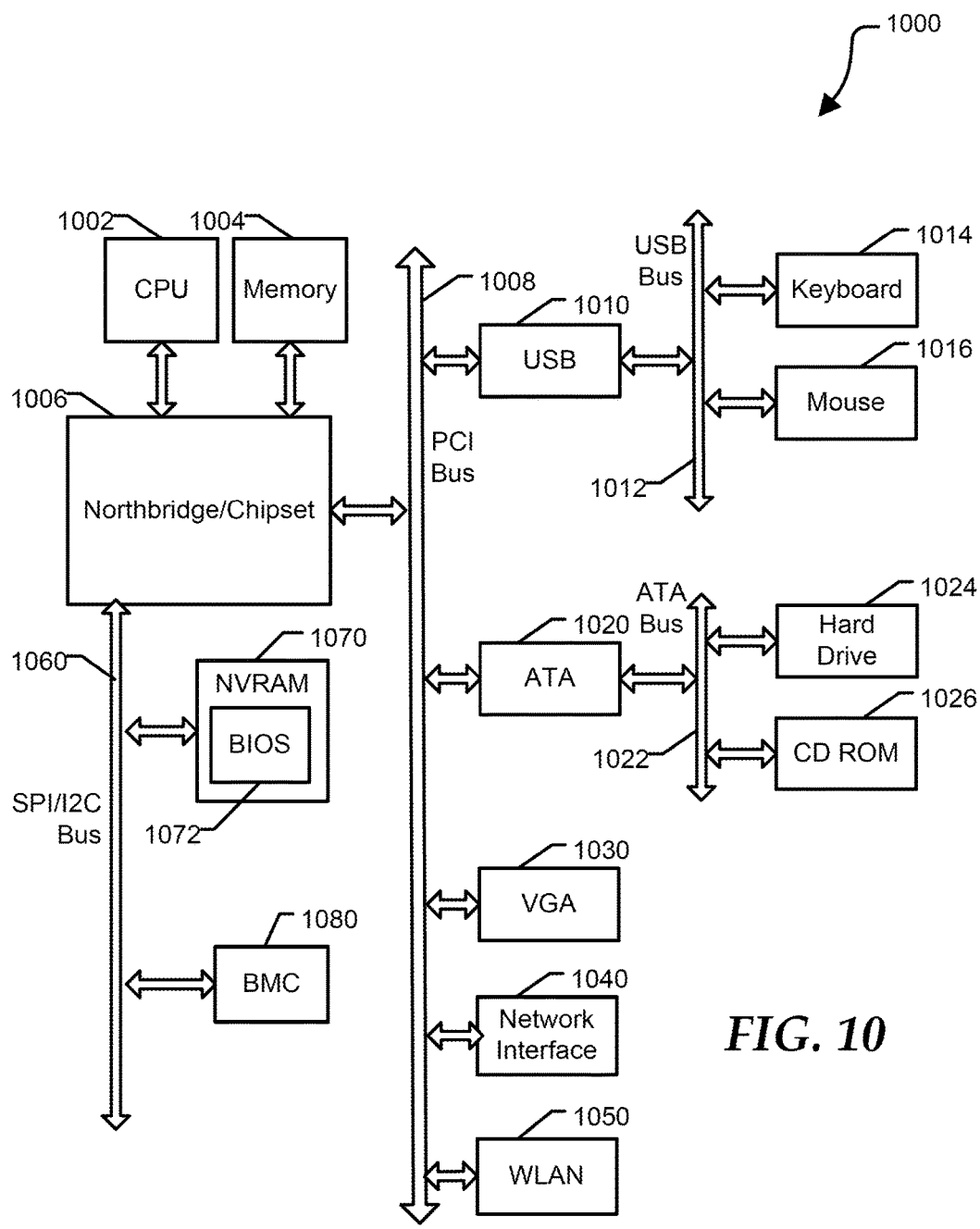
FIG. 10 is a block diagram of an information handling system according to an embodiment of the present disclosure.

FIG. 10 shows an information handling system 1000 including a processor 1002, a memory 1004, a northbridge/chipset 1006, a PCI bus 1008, a universal serial bus (USB) controller 1010, a USB 1012, a keyboard device controller 1014, a mouse device controller 1016, a configuration an ATA bus controller 1020, an ATA bus 1022, a hard drive device controller 1024, a compact disk read only memory (CD ROM) device controller 1026, a video graphics array (VGA) device controller 1030, a network interface controller (NIC) 1040, a wireless local area network (WLAN) controller 1050, a serial peripheral interface (SPI) bus 1060, a NVRAM 1070 for storing BIOS 1072, and a baseboard management controller (BMC) 1080. BMC 1080 can be referred to as a service processor or embedded controller (EC). Capabilities and functions provided by BMC 1080 can vary considerably based on the type of information handling system. For example, the term baseboard management system is often used to describe an embedded processor included at a server, while an embedded controller is more likely to be found in a consumer-level device. As disclosed herein, BMC 1080 represents a processing device different from CPU 1002, which provides various management functions for information handling system 1000. For example, an embedded controller may be responsible for power management, cooling management, and the like. An embedded controller included at a data storage system can be referred to as a storage enclosure processor.

For purpose of this disclosure information handling system 1000 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1000 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 1000 can include processing resources for executing machine-executable code, such as CPU 1002, a programmable logic array (PLA), an embedded device such as a System-on-a-Chip (SoC), or other control logic hardware. Information handling system 1000 can also include one or more computer-readable medium for storing machine-executable code, such as software or data.

System 1000 can include additional processors (not shown at FIG. 1) that are configured to provide localized or specific control functions, such as a battery management controller. Bus 1060 can include one or more busses, including a SPI bus, an I2C bus, a system management bus (SMBUS), a power management bus (PMBUS), and the like. BMC 1080 can be configured to provide out-of-band access to devices at information handling system 1000. As used herein, out-of-band access herein refers to operations performed prior to execution of BIOS 1072 by processor 1002 to initialize operation of system 100.

BIOS 1072 can be referred to as a firmware image, and the term BIOS is herein used interchangeably with the term firmware image, or simply firmware. BIOS 1072 includes instructions executable by CPU 1002 to initialize and test the hardware components of system 1000, and to load a boot loader or an operating system (OS) from a mass storage device. BIOS 1072 additionally provides an abstraction layer for the hardware, i.e. a consistent way for application programs and operating systems to interact with the keyboard, display, and other input/output devices. When power is first applied to information handling system 1000, the system begins a sequence of initialization procedures. During the initialization sequence, also referred to as a boot sequence, components of system 1000 are configured and enabled for operation, and device drivers can be installed. Device drivers provide an interface through which other components of the system 1000 can communicate with a corresponding device.

Information handling system 1000 can include additional components and additional busses, not shown for clarity. For example, system 1000 can include multiple processor cores, audio devices, and the like. While a particular arrangement of bus technologies and interconnections is illustrated for the purpose of example, one of skill will appreciate that the techniques disclosed herein are applicable to other system architectures. System 1000 can include multiple CPUs and redundant bus controllers. One or more components can be integrated together. For example, portions of northbridge/chipset 1006 can be integrated within CPU 1002. Additional components of information handling system 1000 can include one or more storage devices that can store machine-executable code, one or more communications ports for communicating with external devices, and various input and output (I/O) devices, such as a keyboard, a mouse, and a video display. An example of information handling system 1000 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 1000 can include a set of instructions that can be executed to cause the information handling system to perform any one or more of the methods or computer based functions disclosed herein. The information handling system 1000 may operate as a standalone device or may be connected to other computer systems or peripheral devices, such as by a network.

In a networked deployment, the information handling system 1000 may operate in the capacity of a server or as a client user computer in a server-client user network environment, or as a peer computer system in a peer-to-peer (or distributed) network environment. The information handling system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single information handling system 1000 is illustrated, the term "system" shall also be taken to include any collection of systems or sub-systems that individually or jointly execute a set, or multiple sets, of instructions to perform one or more computer functions.

The information handling system 1000 can include a disk drive unit and may include a computer-readable medium, not shown in FIG. 10, in which one or more sets of instructions, such as software, can be embedded. Further, the instructions may embody one or more of the methods or logic as described herein. In a particular embodiment, the instructions may reside completely, or at least partially, within system memory 1004 or another memory included at system 1000, and/or within the processor 1002 during execution by the information handling system 1000. The system memory 1004 and the processor 1002 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A data storage device comprising:
   a data storage medium;
   a drive interface including a terminal for outputting an activity indicator signal, the activity indicator signal operable to be coupled to a light emitting diode, illumination of the diode to indicate an activity at the data storage device; and
   a drive controller coupled to the data storage medium and to the drive interface, the drive controller to:
   access an operational parameter at the device;
   encode the operational parameter using a serial data protocol;
   superimpose the encoded operational parameter on the activity indicator signal; and
   provide the activity indicator signal to a data storage management device, the data storage management device configured to manage operation of the data storage system based on the encoded operational parameters.

2. The device of claim 1, further comprising:
   a temperature sensor;
   and wherein the operational parameter is a temperature provided by the temperature sensor.

3. The device of claim 1, wherein the drive controller is further to:
   generate an error detection code based on the operational parameter; and
   encode the error detection code with the operational parameter.

4. The device of claim 1, where in the encoded operational parameter is superimposed on the activity indicator signal when the signal is either at a logic-high state or at a logic-low state.

5. The device of claim 1, wherein the drive controller is further to:
identify an oscillatory period of the activity indicator signal;
generate a random number corresponding to a fraction of the oscillatory period; and
superimpose the encoded operational parameter on the activity indicator signal based on the random number.

6. The device of claim 1, wherein the drive controller is further to:
identify an oscillatory period of the activity indicator signal;
generate a random number corresponding to a number of oscillatory periods; and
superimpose the encoded operational parameter only at selected oscillatory periods of the activity indicator signal based on the random number.

7. A method comprising:
accessing an operational parameter at a data storage device at a data storage system;
encoding the operational parameter using a serial data protocol to generate an encoded operational parameter;
superimposing the encoded operational parameter on an activity indicator signal outputted by the data storage device, the activity indicator signal configured to be coupled to a light emitting diode, illumination of the diode is to indicate an activity at the device, the accessing, encoding, and superimposing performed concurrent with accesses at the data storage device; and
providing the activity indicator signal to a data storage management device, the data storage management device configured to manage operation of the data storage system based on the encoded operational parameters.

8. The method of claim 7, wherein the operational parameter is a temperature provided by a temperature sensor included in the data storage device.

9. The method of claim 7, further comprising:
generating an error detection code based on the operational parameter; and
encoding the error detection code with the operational parameter.

10. The method of claim 7, wherein the encoded operational parameter is superimposed on the activity indicator signal when the activity indicator signal is either at a logic-high state or at a logic-low state.

11. The method of claim 7, further comprising:
superimposing the encoded operational parameter on the activity indicator signal at a time determined based on a random number provided by a random number generator.

12. A method comprising:
receiving, at a data storage management device, a first activity indicator signal from a first data storage device included at a data management system, the first activity indicator signal configured to illuminate a light emitting diode to indicate an activity at the first data storage device, the first activity indicator signal including a first encoded operational parameter encoded using a serial data protocol, the receiving concurrent with data accesses at a data storage medium at the first data storage device;
decoding the first encoded operational parameter to retrieve a first operational parameter corresponding to the first data storage device; and
modifying operation of the data management system based on the retrieved first operational parameter.

13. The method of claim 12, wherein the first operational parameter is a temperature at the first data storage device.

14. The method of claim 12, wherein the first operational parameter is self-monitoring analysis and reporting technology status information.

15. The method of claim 12, further comprising:
identifying an error detection value included with the first encoded operational parameter; and
validating the first operational parameter based on the error detection value.

16. The method of claim 12, further comprising:
providing the first operational parameter to a service processor at an information handling system.

17. The method of claim 12, wherein the first activity indicator signal further includes an encoded hardware identifier, the encoded hardware identifier decodable to provide a hardware identifier uniquely identifying the first data storage device.

18. The method of claim 12, further comprising:
receiving a second activity indicator signal from a second data storage device, the second activity indicator signal including a second encoded operational parameter encoded using the serial data protocol; and
generating a combined signal based on an exclusive-OR function of the first activity indicator signal and the second activity indicator signal; and
decoding the first encoded operational parameter and the second encoded operational parameter superimposed on the combined signal to retrieve the first operational parameter corresponding to the first data storage device and the second operational parameter corresponding to the second data storage device.

19. The method of claim 18, wherein the first data storage device and the second data storage device are included in a first thermal zone, the method further comprising:
regulating a cooling system corresponding to the first thermal zone based on a selected one of the first operational parameter and the second operational parameter.

* * * * *